Sept. 7, 1943.  E. W. McKINNEY  2,328,732
UNIVERSAL BACKLASH PREVENTION DEVICE
Filed Dec. 2, 1942   2 Sheets-Sheet 1
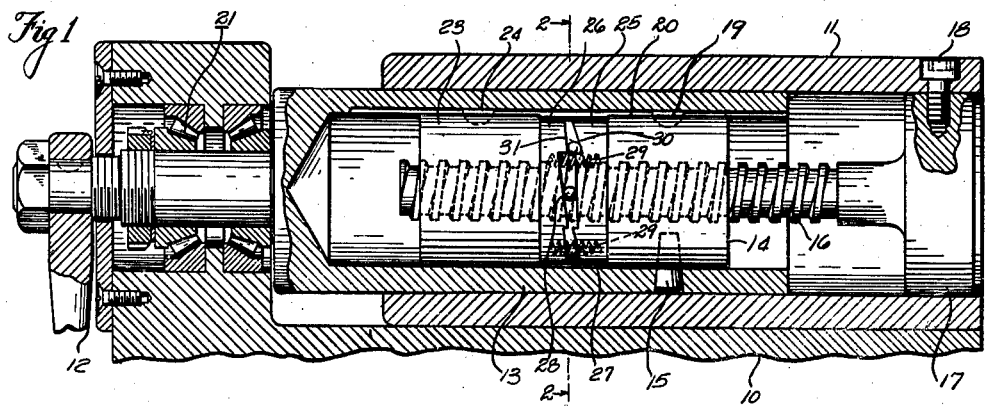
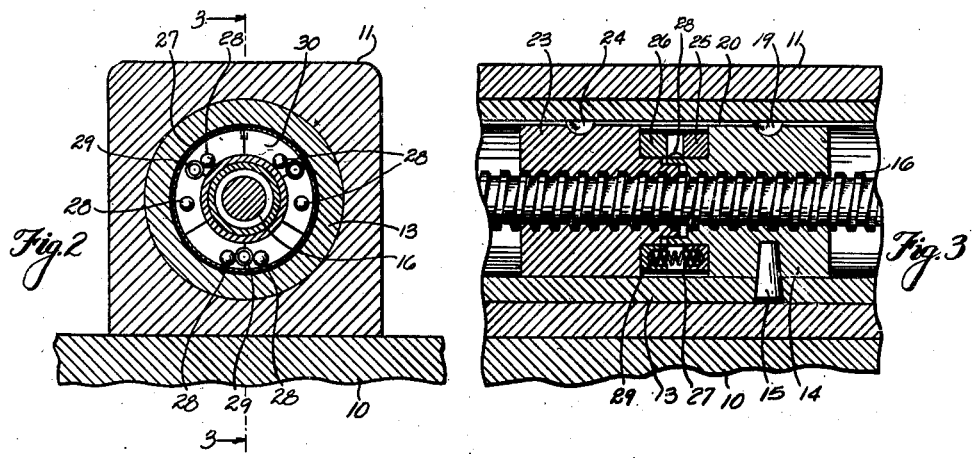
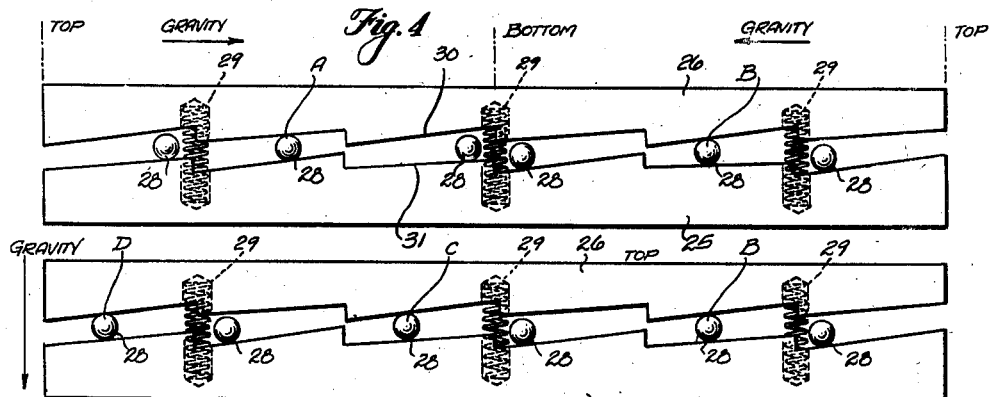
INVENTOR.
Elsmere W. McKinney
BY
Hoodling and Krost
attys

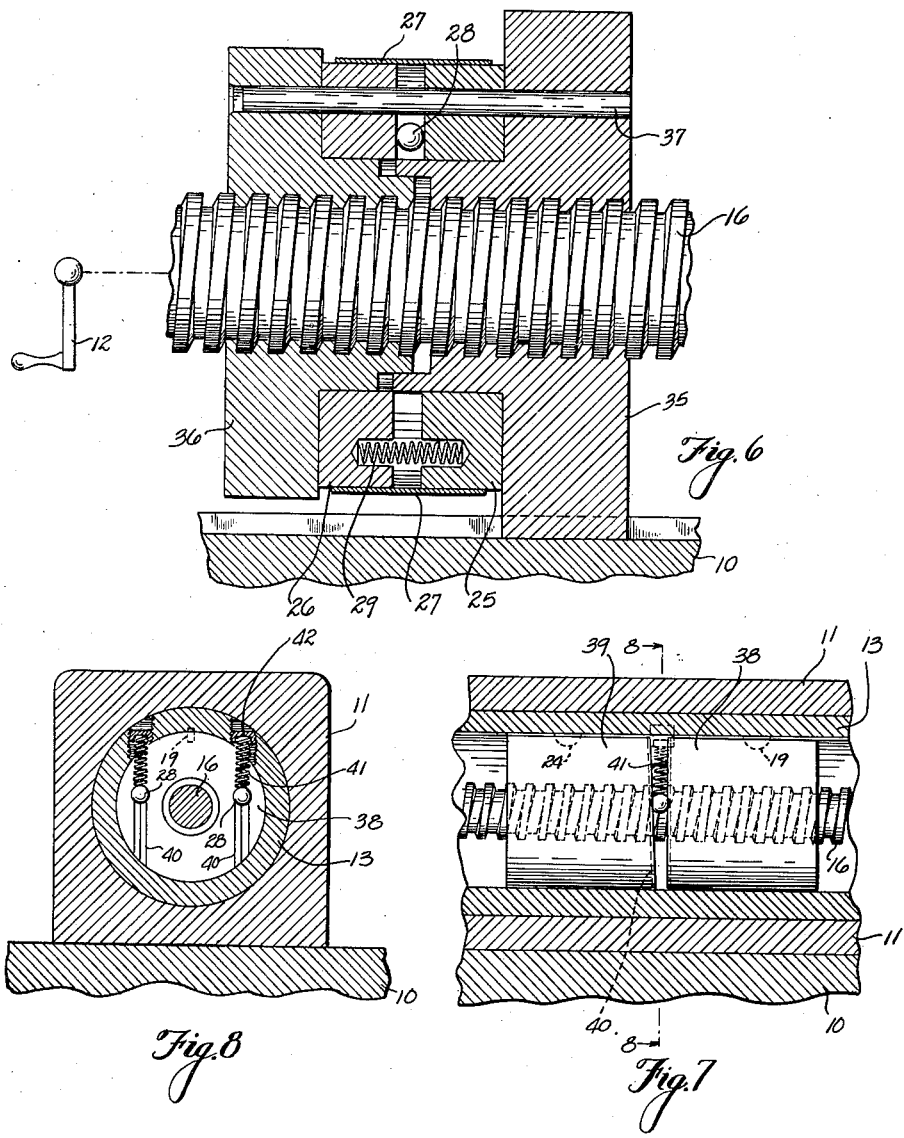

Patented Sept. 7, 1943

2,328,732

UNITED STATES PATENT OFFICE 2,328,732

UNIVERSAL BACKLASH PREVENTION DEVICE

Elsmere W. McKinney, Cleveland, Ohio, assignor to The McKinney Tool and Manufacturing Company, a corporation of Ohio Application December 2, 1942, Serial No. 467,604

7 Claims. (Cl. 74—441)

My invention relates in general to the prevention of lost motion between two elements of a mechanism and more particularly to the prevention of backlash between a threaded element and a threaded member threadably engaging each other, regardless of the position of the threaded element and the threaded member.

An object of my invention is the provision of an arrangement for preventing backlash between a threaded element and a threaded member threadably engaging each other, wherein the arrangement is operative in any and all positions of the threaded element and the threaded member.

The present invention is an improvement over my invention shown, described and claimed in my pending patent application filed June 12, 1941, Serial No. 397,825 for Backlash prevention device, the principal feature of the improvement residing in the fact that the present invention may be used in any and all positions. To this end, the present invention may be referred to as a universal backlash prevention device.

Other objects and a fuller understanding of my invention may be had by referring to the following description and claims, taken in conjunction with the accompanying drawings, in which:

Figure 1 represents a side, longitudinal cross-sectional view of a mechanism embodying the features of my invention;

Figure 2 is an end cross-sectional view taken along the line 2—2 of Figure 1;

Figure 3 is a view taken along the line 3—3 of Figure 2;

Figure 4 is a development shown in the flat, illustrating the novel features of my invention;

Figure 5 is a very similar to Figure 4;

Figure 6 is a fragmentary cross-sectional view showing a modified form of the invention;

Figure 7 shows another modified form of the invention; and

Figure 8 shows a cross-sectional view taken along the line 8—8 of Figure 7.

In a large number of mechanisms, a movable part or object is arranged to be moved with reference to a stationary support by means of a threaded element operated by a crank or hand wheel. In order to provide for the free turning of the threaded element, there is a slight clearance between the threads of the threaded element and the threaded member in which the threaded element engages. This small clearance results in backlash between the two threaded parts. That is to say, one of the threaded parts has to move before communicating its motion to the other threaded part. My invention is arranged to prevent this backlash for any and all positions of the threaded parts.

With reference to the drawings, I illustrate my invention in connection with a mechanism comprising a stationary member or support 10 upon which is slidably mounted a movable element 11 arranged to be actuated by a crank 12 through means of a screw thread engagement. The crank 12 is arranged to actuate a hollow sleeve 13 which may rotate within the movable member 11. Within the hollow sleeve 13 is a threaded member 14 which is secured to the hollow sleeve by means of a key wedge 15 and a locking key 19 which fits in a longitudinal key way 20. As illustrated, a threaded element 16 threadably engages the threaded member 14 and is arranged to be longitudinally moved as the threaded member 14 is rotated by the crank 12. The right-hand end of the threaded element 16 is provided with a head 17 which may be secured to the movable member 11 by means of a screw 18. In operation of the crank 12, the movable member 11 is slidably moved with reference to the stationary member 10. The threaded member 14 may be referred to as a revolving or turning nut and is of a conventional construction. Because of the clearance of the mating threads between the threaded member 14 and the threaded element 16, a backlash is present in the mechanism between the relative movements of the movable member 11 and the stationary support or member 10. In my invention I eliminate this backlash by employing a floating threaded device 23 spaced from the threaded member 14 and threadably engaging the threaded element 16. The floating device 23 is non-rotatively secured to the hollow sleeve 13 by means of a locking key 24 which slidably engages the key way 20. Accordingly, the floating threaded device 23 may have limited longitudinal movement with respect to the threaded element 14.

As illustrated in Figures 1 and 3, the adjacent ends of the threaded member 14 and the floating threaded device 23 are respectively provided with wedging rings 25 and 26, between which a plurality of balls 28 are located. More specifically, the adjacent ends of the floating threaded device 23 and the threaded member 14 have a plurality of pairs of angularly disposed surfaces 30 and 31 which define converging adjacent surfaces between which a ball 28 is located to constrain the floating threaded device 23 and the threaded member 14 apart and against the opposite side surfaces of the threads of the threaded element 16. As shown in Figure 2, the pairs of converging adjacent surfaces 30 and 31 are arranged annularly about the threaded element 16. In the present invention, the pair of converging adjacent surfaces around the threaded element 16 is disposed to have at least one adjacent side surface arranged at a downward angle with respect to the horizontal regardless of the position of the floating threaded device 23 and the threaded member 14. In this manner, my present invention is universally adaptable for any one of many positions. A cover band 27 is positioned externally of the wedging rings 25 and 26 to keep the ball from escaping.

In Figure 4 I have shown a development of the wedging rings 25 and 26 and in this development the wedging rings 25 and 26 have their axes arranged in a horizontal position as shown in Figures 1, 2 and 3. The center of the Figure 4 represents the bottom and the two ends represent the top of the wedging ring and the direction of gravity is towards the bottom as indicated by the arrow line. As illustrated, the two balls A and B are acting to separate the two wedging rings 25 and 26, which urges the floating threaded device 23 and the threaded member 14 against the opposite side surfaces of the threads of the threaded element 16.

In Figure 5 I show a development very much the same as Figure 4 except that the axis of the wedging rings 25 and 26 is vertical instead of horizontal. Consequently, in Figure 5 the force of gravity is downward as indicated by the arrow line and the balls B, C, and D are urged towards the converging ends of the adjacently spaced surfaces. The springs 29 between the wedging rings 25 and 26 are arranged to support the floating threaded device 23 against gravity when the axis of the wedging rings 25 and 26 is vertical. In other words, the springs 29 are made sufficiently strong to support the floating threaded device 23 against gravity which enables the balls to be urged toward the converging end of the angularly disposed surfaces to prevent the backlash between the threaded parts. In all positions of the wedging rings 25 and 26 at least one adjacent side surface of a pair of surfaces is arranged at a downward angle with respect to the horizontal. Therefore, no backlash is present in my invention upon the movement of the crank 12. The wedging action of the balls between the adjacent surfaces is such that they do not cause any jamming of the threads of the threaded element 16 within the floating threaded device 23 and the threaded member 14. The angle between the adjacently disposed surfaces may be relatively small, as illustrated.

In Figure 6 I illustrate my invention with a non-rotating nut 35 and a floating threaded device 36 which is constrained against turning by a pin 37. In Figure 6 the threaded element 16 is turned which is just the reverse from the showing in Figure 1 where the threaded member 14 is turned. The embodiment in Figure 6 employs the same wedging rings 25 and 26 and the same balls 28 as that shown with reference to Figures 1, 2 and 3. The right-hand end of the pin 37 may be pressed or otherwise secured within the non-rotating nut 35 and the left-hand end of the pin is arranged so that the floating threaded device 36 may move longitudinally with respect to the non-rotating nut 35.

In Figures 7 and 8 I show a modified engagement of my invention in that the balls 28 are arranged in vertical grooves 40 in the wedging rings 38 and 39. In order that the arrangement shown in Figures 7 and 8 may be operative for any and all positions of the device, I employ springs 41 to support the balls against gravity. As illustrated, a spring cap 42 may be placed in the hollow sleeve 13 to hold the spring in place. The springs 41 contact the ball to oppose gravity to insure that the balls are urged toward the converging end of the converging surfaces. In Figures 1, 2 and 3 the springs 29 support the floating threaded device 23 to oppose gravity to insure that the balls are urged toward the converging end of the converging surfaces, whereas in Figures 7 and 8 the springs 41 contact the balls for accomplishing the same purpose. The force of the springs 29 in Figures 1, 2 and 3 and the force of the springs 41 in Figures 7 and 8 is not sufficient to jam the threads of the threaded element 16 within the floating threaded device and the threaded member. Regardless of the environment or the position of my backlash prevention device, it functions to prevent lost motion upon the turning of the threads.

In the drawings, I have illustrated the use of the balls 28 for separating the wedging rings, but it is to be understood that rollers, wedges or any other device may be employed, and in the claims I have designated these devices as gravity influenced mass means.

The bearing 21 in Figure 1 in actual manufacture would preferably be a two-way thrust roller bearing so as to be completely free of end play while at the same time turn easily.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. An arrangement for preventing backlash between a threaded element and a threaded member threadably engaging each other comprising, in combination, a floating threaded device spaced from the threaded member and threadably engaging the threaded element, means to constrain the floating threaded device in substantially a fixed angular relation with respect to the threaded member to keep the space between adjacent ends of the floating threaded device and the threaded member substantially constant, the adjacent ends of the floating threaded device and the threaded member having a plurality of pairs of angularly disposed surfaces defining converging adjacent surfaces, and gravity influenced mass means engaging the converging adjacent surfaces of each said pair to constrain the floating threaded device and the threaded member apart and against the opposite side surfaces of the threads of the threaded element, said pairs of converging adjacent surfaces being arranged annularly about the threaded element.

2. An arrangement for preventing backlash between a threaded element and a threaded member threadably engaging each other comprising, in combination, a floating threaded device spaced from the threaded member and threadably engaging the threaded element, means to constrain the floating threaded device in substantially a fixed angular relation with respect to the threaded member to keep the space between adjacent ends of the floating threaded device and the threaded member substantially constant, the adjacent ends of the floating threaded device and the threaded member having a plurality of pairs of angularly disposed surfaces defining converging adjacent surfaces, and gravity influenced mass means engaging the converging adjacent surfaces of each said pair to constrain the floating threaded device and the threaded member apart and against the opposite side surfaces of the threads of the threaded element, said pairs of converging adjacent surfaces being arranged around the threaded element and being disposed to have at least one pair of the diverging adjacent surfaces where the gravity influenced mass means is urged toward the converging end thereof regardless of the position of the floating threaded device and the threaded member.

3. An arrangement for preventing backlash between a threaded element and a threaded member threadably engaging each other comprising, in combination, a floating threaded device spaced from the threaded member and threadably engaging the threaded element, means to constrain the floating threaded device in substantially a fixed angular relation with respect to the threaded member to keep the space between adjacent ends of the floating threaded device and the threaded member substantially constant, the adjacent ends of the floating threaded device and the threaded member having a plurality of pairs of angularly disposed surfaces defining converging adjacent surfaces, and gravity influenced mass means engaging the converging adjacent surfaces of each said pair to constrain the floating threaded device and the threaded member apart and against the opposite side surfaces of the threads of the threaded element, said pairs of converging adjacent surfaces being arranged around the threaded element and being disposed to have at least one adjacent side surface arranged at a downward angle with respect to the horizontal regardless of the position of the floating threaded device and the threaded member.

4. An arrangement for preventing backlash between a threaded element and a threaded member threadably engaging each other comprising, in combination, a floating threaded device spaced from the threaded member and threadably engaging the threaded element, means to constrain the floating threaded device in substantially a fixed angular relation with respect to the threaded member to keep the space between adjacent ends of the floating threaded device and the threaded member substantially constant, the adjacent ends of the floating threaded device and the threaded member having a plurality of pairs of angularly disposed surfaces defining converging adjacent surfaces, and ball means engaging the converging adjacent surfaces of each said pair to constrain the floating threaded device and the threaded member apart and against the opposite side surfaces of the threads of the threaded element, said pairs of converging adjacent surfaces being arranged around the threaded element and being disposed to have at least one adjacent side surface arranged at a downward angle with respect to the horizontal regardless of the position of the floating threaded device and the threaded member.

5. An arrangement for preventing backlash between a threaded element and a threaded member threadably engaging each other comprising, in combination, a floating threaded device spaced from the threaded member and threadably engaging the threaded element, means to constrain the floating threaded device in substantially a fixed angular relation with respect to the threaded member to keep the space between adjacent ends of the floating threaded device and the threaded member substantially constant, the adjacent ends of the floating threaded device and the threaded member having a plurality of pairs of angularly disposed surfaces defining converging adjacent surfaces, and gravity influenced mass means engaging the converging adjacent surfaces of each said pair to constrain the floating threaded device and the threaded member apart and against the opposite side surfaces of the threads of the threaded element, said pairs of converging adjacent surfaces being arranged around the threaded element and being disposed to have at least one adjacent side surface arranged at a downward angle with respect to the horizontal regardless of the position of the floating threaded device and the threaded member, and spring means between the floating threaded device and the threaded member to support the floating threaded device against gravity.

6. An arrangement for preventing backlash between a threaded element and a threaded member threadably engaging each other comprising, in combination, a floating threaded device spaced from the threaded member and threadably engaging the threaded element, means to constrain the floating threaded device in substantially a fixed angular relation with respect to the threaded member to keep the space between adjacent ends of the floating threaded device and the threaded member substantially constant, the adjacent ends of the floating threaded device and the threaded member having a plurality of pairs of angularly disposed surfaces defining converging adjacent surfaces, gravity influenced mass means engaging the converging adjacent surfaces of each said pair to constrain the floating threaded device and the threaded member apart and against the opposite side surfaces of the threads of the threaded element, and spring means to oppose gravity to insure that the gravity influenced mass means is urged toward the converging end of the converging surfaces.

7. An arrangement for preventing backlash between a threaded element and a threaded member threadably engaging each other comprising, in combination, a floating threaded device spaced from the threaded member and threadably engaging the threaded element, means to constrain the floating threaded device in substantially a fixed angular relation with respect to the threaded member to keep the space between adjacent ends of the floating threaded device and the threaded member substantially constant, the adjacent ends of the floating threaded device and the threaded member having a plurality of pairs of angularly disposed surfaces defining converging adjacent surfaces, gravity influenced mass means engaging the converging adjacent surfaces of each said pair to constrain the floating threaded device and the threaded member apart and against the opposite side surfaces of the threads of the threaded element, and spring means contacting the gravity influenced mass means to oppose gravity to insure that the gravity influenced mass means is urged toward the converging end of the converging surfaces.

ELSMERE W. McKINNEY.